Oct. 15, 1957     R. E. BARNABY     2,809,748

DISPENSING CONTAINER

Filed April 20, 1955

INVENTOR.
ROLAND E. BARNABY

BY

John C. McGregor

ATTORNEY

United States Patent Office 2,809,748
Patented Oct. 15, 1957

2,809,748

DISPENSING CONTAINER

Roland E. Barnaby, Stoneham, Mass., assignor, by mesne assignments, to Rayline, Inc., Mineola, N. Y., a corporation of New York Application April 20, 1955, Serial No. 502,573

6 Claims. (Cl. 206—56)

This invention relates to dispensing containers and more particularly to dispensing containers for solder or like materials in strip or wire form.

Solder is conventionally packaged in coiled form from which it is drawn off as needed simply by unwinding the top coil. In some packaging it is intended that the bare coils be held in the hand when soldering and in others that the package or carton itself be held with a length of the free end of the coils projecting therefrom through a suitable opening. Manipulation of the bare coils of solder is unsatisfactory because the supply tends to become disarranged and also because there is danger of burning the fingers or even of shock. The dispensing cartons have not been altogether satisfactory, particularly when the supply is partially consumed because the free or working end of the solder tends to be forced back into the carton so that the solder cannot be effectively pressed against the work.

It is accordingly an object of the present invention to provide a dispensing container for solder or like materials in strip or wire form which overcomes the several disadvantages noted above.

It is a further object of the invention to provide a dispensing container which is simple in design and highly effective in operation.

In accordance with the present invention a dispensing container is provided in the form of a pair of coaxial tubes fitted one within the other and a supply of solder is wound in the more or less toroidal space between the two. The free or working end of the solder is passed into the inner tube adjacent one end, through the length thereof, hence through the windings of solder, and through an opening at the other end. Suitable means such as a dispensing head is provided to hold the tubes and wound solder in position and through which the free end of the solder is passed to be used as needed, with additional lengths being drawn out as the solder is consumed. So arranged, the solder can be carried to the work by holding the container assembly in one hand and the soldering iron in the other and no matter how low the supply of solder becomes in the container, the free end cannot readily be forced back into the container. In this fashion efficient manipulation of the solder is carried out without danger of burning or electric shock.

Figure 1:
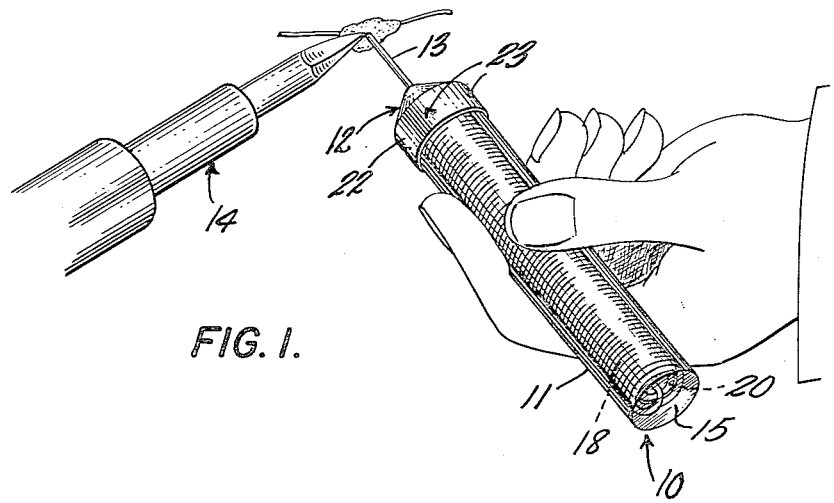
Figure 2:
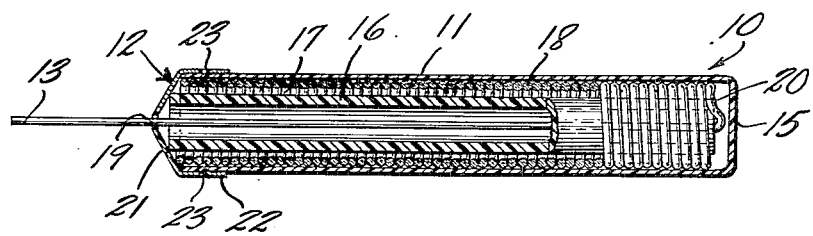

A representative embodiment of the invention from which the above and other features thereof will be readily understood is described in the following specification taken in conjunction with the accompanying drawing in which:

Figure 1 is a view in perspective showing how the solder dispensing container of the present invention can be used; and Figure 2 is a view in longitudinal section of the solder dispensing container of Figure 1.

Referring to the drawing, there is shown in Figure 1 a solder dispensing container 10 formed in accordance with the present invention including a body portion 11 and a dispensing head 12 from which projects the free or working end 13 of a source of supply of solder in wire or like form. The projecting end 13 can be brought to the work by holding the dispensing container 10 in one hand and a soldering iron 14 in the other, and as the projecting end 13 is consumed additional lengths thereof can be drawn from the supply within the body portion 11. In no case, as will be apparent from the following disclosure, does the free end tend to fall back into the container when it is pressed against the work.

Referring now to Figure 2, the body portion 11 can take the form of a tube, preferably of an electrically insulating material such as plastic permanently capped at its base end 15 and closed at its head or dispensing end by the dispensing head 12. Preferably the tubular body portion 11 is transparent so that the supply of solder therein is readily visible and so that, if desired, a suitable identifying label can be inserted. Received within the tubular body portion 11 is an inner guide member 16 which can take the form of a tube of smaller diameter than and of substantially the same length as the outer portion 11, the outer surface of the guide member 16 and the inner surface of the portion 11 defining a more or less toroidal space 17 in which is received a supply of solder 18 wound in the form of a helix.

The free or working end 13 of the solder supply 18 is brought through the back end of the guide member 16, near the base 15, passed through the entire length of the member 16 and hence through the helically wound supply 18 to pass out through the dispensing head 12 via an aperture 19. The base end of the member 16 is formed with smooth rounded edges 20 to permit the solder to slide thereover in a sharp angle as described below.

The dispensing head 12 can be formed with a conical head portion 21 in the apex of which the aperture 19 is formed, and a cylindrical skirt 22 which attaches to the body portion 11. The dispensing head 12 should be tightly secured to the body portion 11 against the axial displacement in order to prevent its falling off under the pressure of the dispensing operation and to this end anchoring means in the form of a plurality of inwardly struck, delta shaped lugs 23 can be provided about the cylindrical skirt 22. The inwardly struck lugs 23 are angled reversely or forwardly to permit the dispensing head 12 to be slid on to the body portion 11 but to dig into its surface when forces are applied tending to separate the two parts.

The free end 13 of the solder is drawn from the dispensing head as needed, with the solder uncoiling from the supply and feeding in a sharp bend into the base end of the inner member 16 to pass to the dispensing head through the solder helix. In this fashion there is developed a substantially straight length of solder running the entire length of the dispensing container 10, held against severe bending or bunching by the closely adjacent walls of the guide member 16. Consequently, the dispensing process is substantially irreversible, preventing the free end 13 from being forced or falling back into the dispensing container as the supply 18 is gradually consumed down to the last spiral of the supply. This enables the dispensing container to be gripped in the hand to carry the projecting end 13 of the solder to the work to steady the solder thereon without attendant back feeding of the solder. The solder can, therefore, be carried to the work as conveniently as if a short length of solder were held in the fingers, but without any likelihood of burning the fingers by heat flow back along the solder. Moreover, the dispensing container 10, being formed of electrically insulating material, there is no danger of electrical shock in the event the work has a voltage impressed thereon.

It will be understood that the invention can take numerous shapes and forms without departing from the

I claim:

1. Dispensing means comprising a hollow, tubular outer portion, means forming a dispensing opening adjacent one end of the outer portion and a base adjacent the other, and locking means comprising a tubular inner guide portion disposed within the outer portion and having a product input opening adjacent the base end and a product output opening adjacent the dispensing opening, said inner and outer portions being of different diameters to define therebetween a product storage space, a length of flexible strip material having sufficient stiffness to be self-supporting, such as wire solder, coiled in said space, said coiled strip material being coiled about the inner guide portion with radial clearance and the inner guide portion being movable radially within the coil, said strip material passing from the storage space into the product input opening of the inner portion, along the length thereof and through both said output and dispensing openings, whereby the dispensing operation is substantially irreversible, due to the stiffness of said strip material extending along the full length of the tubular guide portion to said base, to resist retrograde motion of the product to the storage space, and whereby the inner guide portion is free to nutate within coil as the strip material is dispensed.

2. A dispensing container as set forth in claim 1, said product input opening in the inner tubular portion having rounded edges to facilitate the sliding of the product thereabout in a sharp angle during the dispensing operation.

3. A dispensing container as set forth in claim 1 including a dispensing head affixed to one end of the outer tubular member, said dispensing opening being formed in said head.

4. A dispensing container as set forth in claim 3, said dispensing head having an internally concave portion, said inner tubular member extending into the concave portion to be positioned in a relatively fixed lateral position with respect to the tubular outer portion.

5. A dispensing container as set forth in claim 3, said dispensing head having a tubular sleeve portion adapted to be fitted over the end of the tubular outer portion, and locking member comprising sharp inwardly struck lugs on the sleeve portion reversely inclined to engage the surface of the outer portion to resist removal thereof.

6. Dispensing means for solder in strip wire form comprising an outer hollow tube closed at one end, a second hollow tube mounted coaxially within said outer tube, a length of solder in strip form and having stiffness wound in the space between said tubes, input means on said inside tube closely adjacent the closed end of said outer tube, said input means permitting entry of said solder into said inner tube in a sharp bend, and solder output means at the other ends of said inside and outside tubes, whereby the stiffness of said solder and said sharp bend adjacent the closed end of the outer tube prevents backward movement of said solder.

References Cited in the file of this patent

UNITED STATES PATENTS

| 514,558 | Kny | Feb. 13, 1894 |
| 1,443,043 | Ross | Jan. 23, 1923 |
| 1,851,243 | Egli | Mar. 29, 1932 |
| 2,372,859 | Sparks | Apr. 3, 1945 |

FOREIGN PATENTS

| 292,581 | Switzerland | Nov. 2, 1953 |